United States Patent [19]

Hanyuda et al.

[11] Patent Number: 4,879,762
[45] Date of Patent: Nov. 7, 1989

[54] OPTICAL REPEATER AND REGULATED CURRENT FEEDING SYSTEM FOR THE SAME

[75] Inventors: Ken Hanyuda, Yokohama; Michimasa Ohara, Kawasaki, both of Japan

[73] Assignee: Fujitsu Limited, Kawasaki, Japan

[21] Appl. No.: 933,114

[22] Filed: Nov. 21, 1986

[30] Foreign Application Priority Data

Nov. 25, 1985 [JP] Japan .................. 60-262461

[51] Int. Cl.⁴ ............................................. H04B 9/00
[52] U.S. Cl. .................................................. 455/601
[58] Field of Search ............. 455/601, 602, 606, 607, 455/617, 612; 379/348; 363/62

[56] References Cited

U.S. PATENT DOCUMENTS

| | | | |
|---|---|---|---|
| 4,255,782 | 3/1981 | Joyce | 363/8 |
| 4,622,480 | 11/1986 | Uchimura et al. | 307/496 |
| 4,654,769 | 9/1987 | Middlebrook | 363/62 |

FOREIGN PATENT DOCUMENTS 56-154839  11/1981  Japan .................. 455/601

Primary Examiner—Robert L. Griffin
Assistant Examiner—Leslie Van Beek
Attorney, Agent, or Firm—Staas & Halsey

[57] ABSTRACT

A power supply circuit, which steps down an input voltage, is provided in an optical repeater for an optical communications path. A DC current supplied from a regulated current supply through a conductor is increased by the power supply circuit before being provided to the amplifier circuit of the optical repeater, so that power consumption is reduced.

6 Claims, 5 Drawing Sheets

OPTICAL REPEATER AND REGULATED CURRENT FEEDING SYSTEM FOR THE SAME

BACKGROUND OF THE INVENTION

The present invention relates to an optical communications system and more specifically to a power supply system used in an optical communications system in which at least one optical repeater is provided in an optical communications path; a regulated DC current source, which supplies a constant DC current to each repeater, is provided at one or both ends of the optical communications path; and power is supplied to each optical repeater from the DC current source through conductors.

A power supply system according to the present invention can be employed in an ordinary optical communications system and is also suitable for use in an optical communications system having a long transmitting or receiving distance requirement, for example, an underwater optical communication system.

In various wired power supply systems for communications systems, such as a power supply system which supplies power from a terminal station to intermediate repeaters provided at constant intervals along a cable or cables, a variety of methods are known to supply regulated AC or DC voltage or current to the repeaters, the repeaters being connected in series or in parallel throughout the power supply path.

If AC power is supplied to the repeaters, rectifying and smoothing circuits must be provided for the repeaters, resulting in a complicated circuit. An advantage of using AC power, however is that a simple transformer can be employed to supply the AC voltage. This power supply method is often employed in transmission systems utilizing electron tube type repeaters, which require various voltage values to function. However, the power factor is lowered by the capacitance and inductance of the transmission cables used and, therefore, the voltage drop is high, reducing the power transmission efficiency (power required for all repeaters ÷ power transmitted).

Since the output of DC power supplies is not influenced as greatly by the inductance and capacitance of the transmission cable, it is relatively easy to supply constant power to the repeaters utilizing a DC power supply, and still maintain high power transmission efficiency. Accordingly, this method is often employed in transmission systems utilizing transistorized repeaters which are operated by DC voltage. In addition, since an underwater coaxial communications system requires highly reliable repeaters and must provide signal power transmission over a long distance, a DC power supply system, having a very stable output and utilizing repeaters of simple construction, is employed.

FIG. 1 illustrates an ordinary DC power supply system for a communication system. The n-repeaters, 1 through n respectively, are connected in series to the power supply path C1, and a constant current I is supplied to each repeater from the regulated current supply equipment 1 and 10, respectively provided at the end of the power transmission path. In this case, the regulated current supply equipment 1 and 10 is provided at both ends because each power supply provides power to n/2 repeaters and, as a result, the load on the power supplies is reduced. This method is used for a system which has a long transmission distance requirement, such as an underwater coaxial communication system. If the transmission distance is short, or if each power supply in FIG. 1 has a sufficient power rating and one of the power supplies fails, power can be supplied by only one power supply. The DC power supply system illustrated in FIG. 1 can also be employed in an optical fiber cable communication system, including an underwater optical communication system.

In an optical transmission system it is impossible to supply the power supply current by superposing it on the transmission signal using the communication path itself as is done in a coaxial system, so a power transmission conducting path is provided within the optical fiber cable, and power is fed through the conducting path. This cable arrangement is illustrated in FIG. 3, which is described below.

FIG. 2 illustrates an optical repeater used in an existing optical communication system. As illustrated in Fig. 2, an optical repeater has a signal amplifier circuit 42 comprising a photoelectric conversion element, an amplifier circuit and a light-emitting element. A current $I''$ is drawn from the supply current $I'$ provided through the power supply path C1, in order to supply the necessary power to the signal amplifier circuit 42. A voltage $V_R$ across zener diode 41', obtained by applying current $I'''$ to the zener diode 41', is also supplied to the signal amplifier circuit 42. As a result, a power $V_R \times I''$ is supplied to the signal amplifying circuit 42. C2 is a signal transmission path formed by an optical fiber. The conventional power supply circuit 41' illustrated in FIG. 2 is formed by a zener diode and has the advantage that it is small and reliable, but it also has the disadvantage that it raises the supply current requirement of the optical repeater to about 1 to 2A. This value is quite a bit larger than the supply current requirement for a coaxial cable system, which is 100 to 200mA. The difference in requirements is due to the fact that an optical repeater requires a bias current and a drive current for an optical semiconductor, such as a laser diode or an avalanche photodiode, and therefore a larger amount of current is consumed by an optical repeater system in comparison to a coaxial cable system.

Since the power consumed by the power transmission path C1 of FIG. 2 is proportional to the square of the supply current in a regulated current supply system, the power supply equipment in a conventional optical communication system must be considerably large in size in order to compensate for the power consumption in the power transmission path C1. This is particularly true in a long range transmission system such as an underwater optical communication system. This large power consumption by the power transmission path C1 is a serious problem from an economic standpoint. For example, in a conventional coaxial cable system, a supply voltage of approximately 5kV is required, but in a conventional optical communication system, a supply voltage of approximately 15kV is required. As a result of having to supply such a high voltage, the selection of circuit elements and mounting of such circuit elements becomes difficult and expensive.

SUMMARY OF THE INVENTION

It is an object of the present invention to provide an optical repeater which has a reduced supply current requirement.

It is another object of the present invention to provide a regulated current feeding system for an optical communication system utilizing such an optical repeater.

According to the present invention, an optical repeater is coupled between an optical transmission line composed of optical fibers and a conductor, the repeater comprising an electrical circuit for converting input optical signals, received from the input side of said optical transmission line, to electrical signals, for amplifying said electrical signals, for converting the amplified electrical signals to output optical signals, and for transmitting said output optical signals to the output side of said optical transmission line; and a power supply circuit connected in series with said conductor for receiving regulated DC current from at least one terminal of said optical transmission line, for receiving said regulated DC current, for dropping the received voltage of said regulated DC current, and for supplying higher DC current than said regulated DC current to said electrical circuit.

BRIEF DESCRIPTION OF THE DRAWINGS

Throughout the drawings, identical parts are designated by the same reference characters.

DETAILED DESCRIPTION OF THE PREFERRED EMBODIMENT

Figure 1:
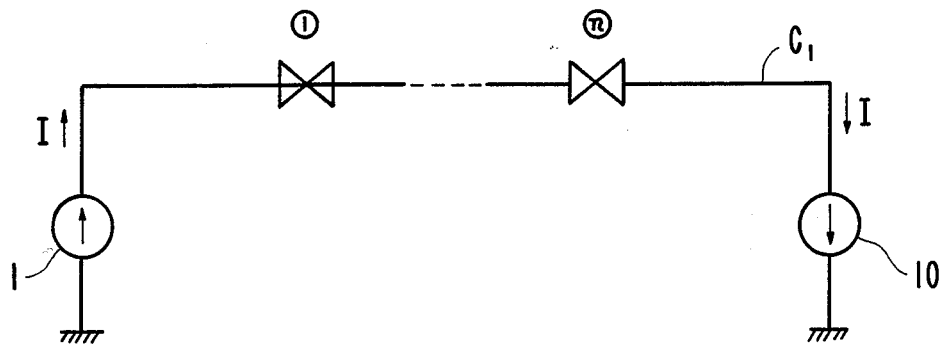
FIG. 1 is a circuit drawing of an existing regulated current feeding system in a wired transmission system.
Figure 2:
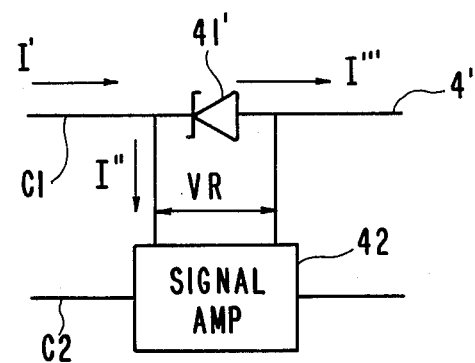
FIG. 2 is a block diagram of an optical repeater used in an existing system for optical communication.
Figure 3:
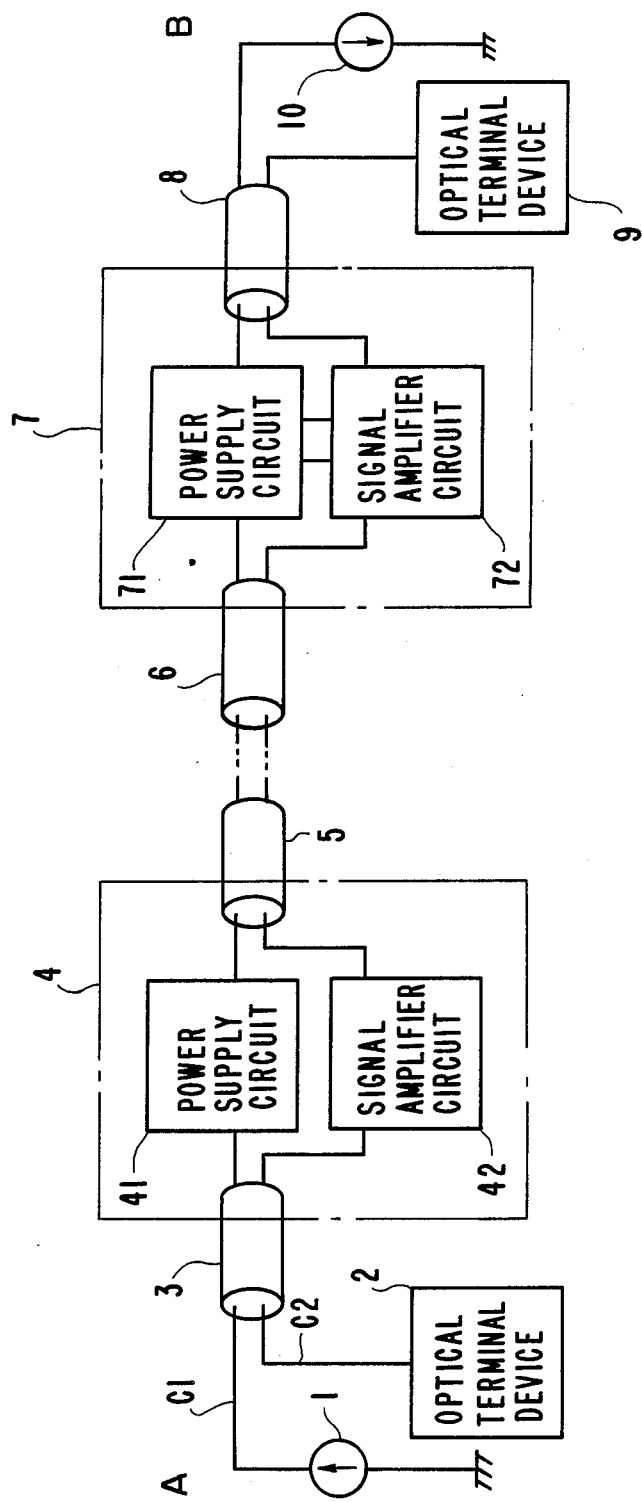
FIG. 3 is a block diagram of an optical communication system to which the regulated current feeding system for optical communication of the present invention is applied.

FIG. 3 is a block diagram of an example of an optical communication system to which the present invention can be applied. In this figure, an optical terminal A and terminal B are connected with optical fiber cables 3, 5, 6 and 8, and a plurality of optical repeaters 4, 7 are provided between such cables. The optical fiber cables are formed by the optical fiber C2, for transmitting optical information, and a conductor (power supply path) C1 for supplying power to the optical repeaters. The optical terminal devices 2 and 9 are connected to optical fiber C2 at terminal A and terminal B, respectively. Regulated current sources 1 and 10 are coupled to conductor C1 at terminals A and B, respectively.

The signal amplifier circuits 42, 72 and current-fed switching type power supply circuits 41, 71 are provided within the optical repeaters 4, 7.

Figure 4:
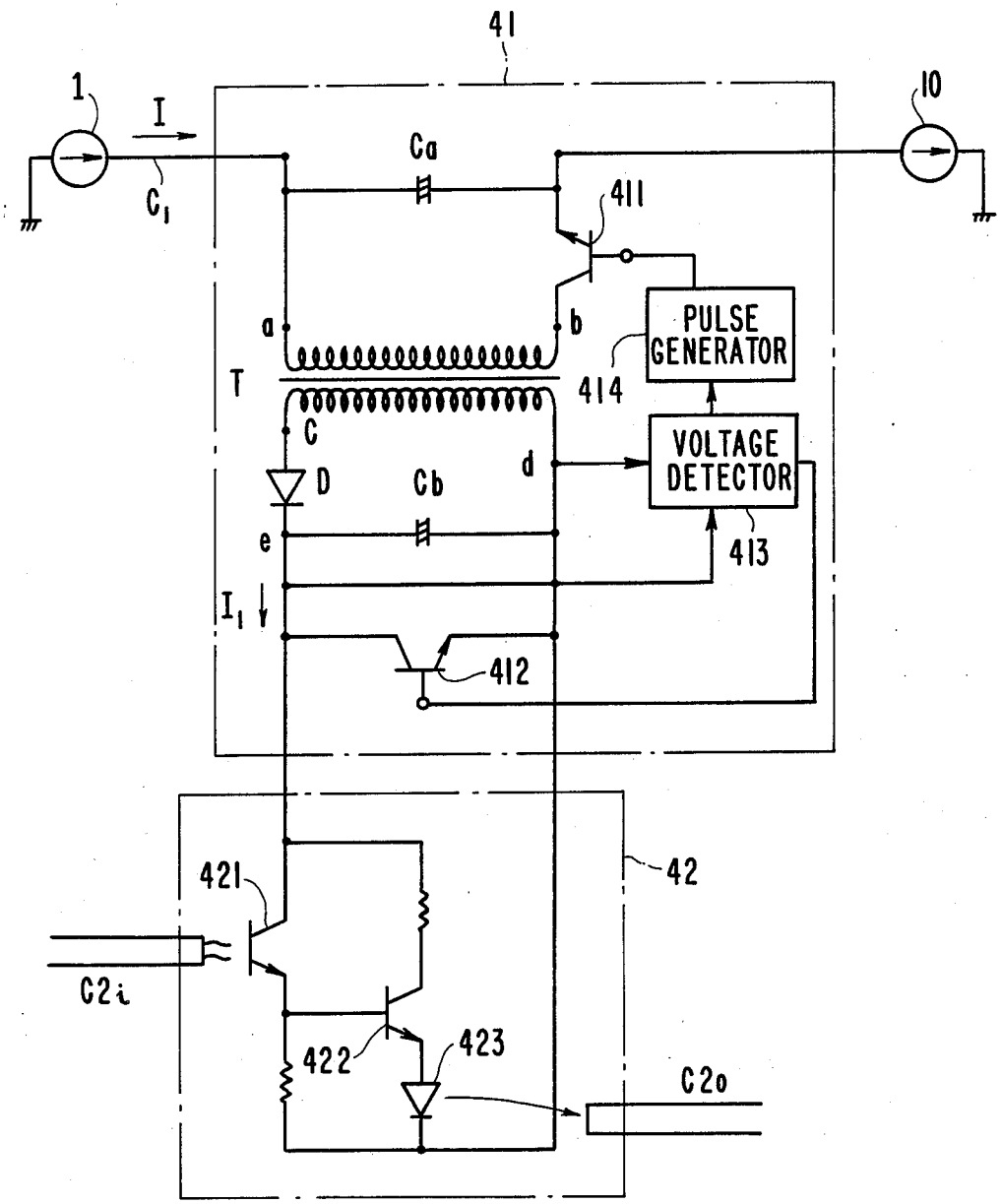
FIG. 4 is a circuit diagram of an optical repeater according to the present invention.

An embodiment of the optical repeaters 4 and 7 is described with reference to FIG. 4. The signal amplifier circuit 42 comprises: a light receiving element 421, which senses the optical signal from the optical fiber $C2_i$ and converts it to an electrical signal; a transistor 422, which amplifies the signal sent from the light receiving element; and a light emitting element 423, which receives the amplified signal and emits the light to the next optical fiber $C2_o$. The current-fed switching type voltage-drop power supply circuit 41 supplies power to the signal amplifier circuit 42 and comprises transistors 411 and 412, step-down transformer T, rectifying diode D, capacitors Ca and Cb, voltage detection circuit 413, and pulse generating circuit 414. The primary side of transformer T is connected to the conductor C1, and the secondary side supplies power to signal amplifier circuit 42, through the rectifying diode D.

The transistor 411 converts a constant current into an AC voltage by alternately switching between an ON and an OFF state, in accordance with the pulse frequency and pulse width supplied from the pulse generating circuit 414, and the transformer T steps down the AC voltage supplied across the primary side thereof. An AC current obtained across the secondary side of transformer T is rectified by the diode D, regulated to a constant voltage by controlling the pulse width supplied to the transistor 412, and is supplied to the signal amplifier circuit 42. The capacitors Ca and Cb are provided for smoothing. The voltage detection circuit 413 triggers the pulse generating circuit 414 when a DC voltage measured across terminals e and d is higher than a predetermined value, causing it to generate a pulse of a predetermined width and a predetermined frequency. This pulse is applied to the base of transistor 411. The voltage detection circuit 413 makes the voltage across terminals e and d constant by controlling the base of transistor 412.

Since the voltage across terminals c and d of the secondary side is obtained by stepping down the voltage applied to terminals a and b of the primary side with the transformer T, a current $I_1$ flowing through the secondary side is higher than the current I supplied to the primary side of transformer T from the regulated current source 1. The power supplied to the primary side of transformer T is substantially equal to the power obtained at the secondary side. Therefore, a current lower than the current required for driving the signal amplifier circuit 42 can be supplied by the regulated current sources 1 and 10.

Since the voltage supplied to the signal amplifier circuit 42 is obtained from the current-fed switching type power supply circuit 41, utilizing a supply current I as described above, the voltage drop in conductor C1 of a regulated current I is lowered comparatively. Therefore, the difficulty of selection and mounting of circuit parts of the prior art, due to a high voltage requirement, is solved.

Figure 5:
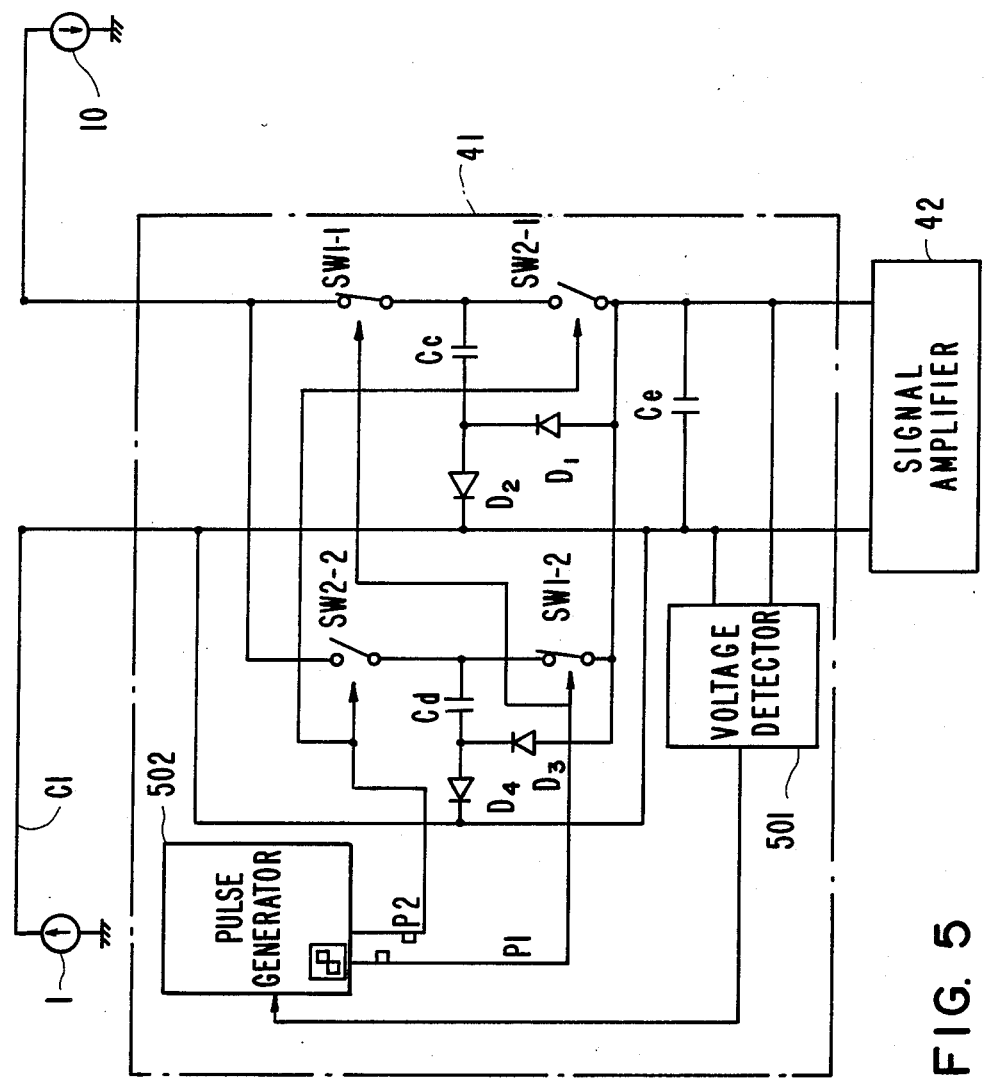
FIG. 5 is a circuit diagram of an optical repeater of another embodiment of the present invention.

FIG. 5 illustrates a second embodiment of the present invention. In this embodiment, the current-fed switching type power supply circuit 41a is formed by a switched capacitor circuit. Recent advances in ceramic technology have led to the development of a high frequency switching type power supply circuit which does not require the use of an electrolytic capacitor and a transformer to form a switched capacitor circuit in a hybrid IC or LSI, but instead utilizes a ceramic capacitor and ceramic substrate. In the second embodiment of the present invention, this new high frequency switching type power supply is used as the power supply circuit to provide power to the signal amplifier 42.

In FIG. 5, the switched capacitor circuit 41a comprises switches SW1-1, SW1-2, SW2-1, SW2-2; ceramic capacitors Cc, Cd, Ce; rectifying diodes D1, D2, D3, D4; voltage detection circuit 501, and pulse generating circuit 502. The voltage detection circuit 501 detects an input voltage from the signal amplifying circuit 42

(same as that illustrated in FIG. 4) and triggers the pulse generating circuit 502 in accordance with the input voltage. The pulse generating circuit 502 outputs two complementary pulses P1, P2 having a period and pulse width which depend on the output signal of voltage detection circuit 501. The pulse P1 controls the switches SW1-1, SW1-2, while the pulse P2 controls the switches SW2-1, SW2-2. When the switches SW1-1, SW1-2 are ON the switches SW2-1, SW2-2 are OFF. When the switches SW1-1, SW1-2 are OFF, the switches SW2-1, SW2-2 ON. While the switches SW1-1, SW1-2 are ON, a current flows through the capacitor Ce and diode D1 to capacitor Cc, charging the capacitor Cc. The capacitor Cd is not charged because the switches SW2-1, SW2-2 are OFF. When the switches SW2-1, SW2-2 become ON, a current flows through the capacitor, Ce, diode D3, and switch SW2-2, charging the capacitor Cd. Meanwhile, the capacitor Cc discharges through the diode D2, amplifier circuit 42, and SW2-1. The capacitors Cd, Ce are connected in parallel for the input of signal amplifier circuit 42. A voltage which is lower than the charging voltage across the capacitors Cc and Cd or Cd and Ce can be attained by selection of the period and pulse width of the two pulses P1, P2 output from the pulse generating circuit 502 and the capacitance values of the capacitors Cc, Cd and Ce. This voltage is applied to the signal amplifier circuit 42. As described above, according to the second embodiment of the present invention, a current which is lower than that required for driving the signal amplifier circuit 42 can be supplied from the regulated current source 1. This embodiment provides a long operating life because a ceramic capacitor is used in place of the electrolytic capacitor, and easy mounting is also possible because it is formed as a hybrid IC.

Figure 6:
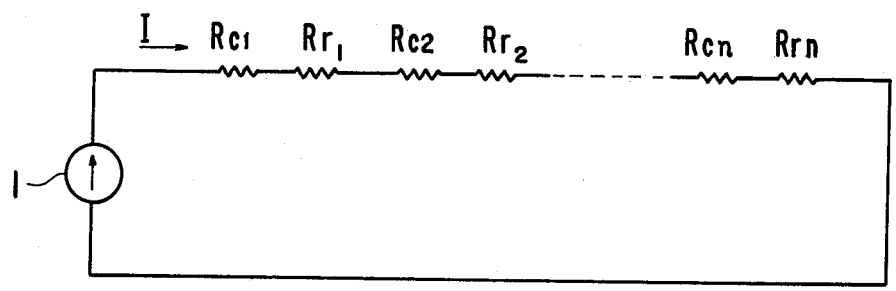
FIG. 6 is a circuit diagram of an equivalent circuit of FIG. 3.

FIG. 6 shows an equivalent circuit of FIG. 3 utilizing the current-fed switching type power supply circuit 41 or 41a, considered from the viewpoint of power consumption. In FIG. 6, $R_{c1}$, $R_{c2}$, ..., $R_{cn}$ represent the resistance of the conductor C within the optical fiber cable, and $R_R$ represents the impedance of each optical repeater.

Figure 7:
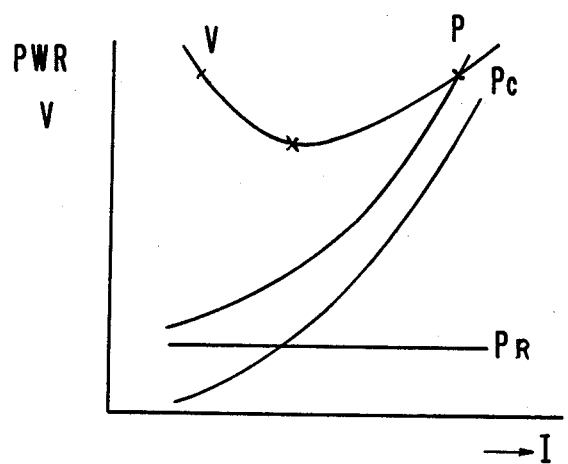
FIG. 7 is a graph showing characteristic curves indicating power consumption of an optical repeater and power transmission path in a regulated current feeding system according to the invention.

The power consumption of each optical repeater R is equal to the sum $P_R$ of the power consumption of the current-fed switching type power supply circuit and the signal amplifier circuit of each repeater, and is indicated as $P_R = I^2 R_R$ for the supply current I, where $R_R$ equals the impedance of one repeater. Since the electrical components of each repeater are the same, the power consumption $P_R$ for each is also the same. Therefore, the total power consumption $P_{tot}$ of this system can be expressed as $P_{tot} = P_{ct} + P_{Rt}$, where the total power consumption of the conductor is indicated as $P_{ct} = I^2 (R_{c1} + R_{c2} ... + R_{cn})$ and the total power consumption of the optical repeaters is indicated as $P_{Rt} = I^2 n R_R$, where n represents the number of repeaters. FIG. 7 graphically portrays such a relation. The power consumption of each repeater ($P_R$) expressed as a function of voltage and current, is $P_R = IV$. Therefore, the power consumption of each optical repeater $P_R$ is constant because it does not depend on the supply current. That is, if the supply current is decreased, the voltage will be increased to keep the power consumption of the optical repeater constant. The power consumption Pc of the conductor c is proportional to the square of the supply current. Meanwhile, the supply voltage V depends on the supply current and has the characteristic illustrated in FIG. 7.

The supply voltage V can be minimized when the power consumption of the repeater is equal to that of the conductor. On the other hand, from the point of view of minimizing total power consumption, it is better to reduce the supply current as much as possible. However, if it is greatly reduced, the operation of the current-fed switching type power supply circuit is affected, and there is also an increase of the supply voltage requirement. Therefore, the supply current must be selected with these two factors in mind.

The above relation is explained in the following example. In the circuit of the example, the power consumption of each optical repeater is 40W, the resistance value of the conductor is 1 ohm/km and the transmission path, of 1000 km in length, is connected through 25 repeaters. In a conventional optical communication system having the above specifications, if the supply current is 2A, the total power consumption of the repeaters is 1 kW, and the power consumption of the conductor is 4 kW. Therefore, a total of 5 kW is required as the supply power. In this case, the supply voltage is 2.5 kV. Meanwhile, when the supply current is set to 0.5A based on the present invention, the power consumption of the conductor is lowered to 0.25 kW and the total power consumption of the repeaters is equal to 1 kW. Therefore, the total supply power required is 1.25 kW, which is about ¼ of that required by the conventional system. The feeding voltage is 2.5 kV, which is equal to that of conventional system. Moreover, when the supply current is set to 0.2A in the present invention, the power consumption of the conductor becomes 0.04 kW, which is about ¼ of the total power consumed by the conventional system. In this case, the supply voltage is increased, but remains at a relatively low value of approximately 5.2 kV.

The current-fed switching type power supply circuits presently being used have an efficiency of 80% or more. Assuming the loss of such a power supply circuit to be 20%, the power consumed by each repeater becomes 48W and total power becomes 1.45 kW. Therefore, even when considering the loss of the power supply circuit provided to each repeater, the total power consumption can still be lowered substantially in comparison to that of the existing system.

As described above, the optimum supply current can be chosen considering factors such as the communication distance and the power consumption of the repeaters, etc. so that the power consumption is minimized and the increase of the supply voltage is limited to a certain degree.

The present invention lowers the power consumption of optical communication systems and reduces the size of power supply equipment by decreasing the required supply current.

What is claimed is:

1. An optical repeater, having an input and an output, which is coupled to an optical transmission line formed by an optical fiber and a conductor, said optical repeater comprising:
   an electrical circuit including:
      means for converting a first optical signal, received at the input of said optical repeater, to an electrical signal;
      means for amplifying the electrical signal;
      means for converting the amplified electrical signal to a second optical signal; and
      means for transmitting the second optical signal from the output of said optical repeater; and power supply means for supplying power to said electrical circuit directly connected in series with the conductor including:
  means for receiving a regulated DC current signal directly from the conductor; and
  means for dropping the voltage and raising the current of the regulated DC current signal, and for supplying a DC current signal, having a current higher than the current of the regulated DC current signal, to said electrical circuit, said means for dropping comprising a switched capacitor circuit having an input connected to said conductor and an output connected to said electrical circuit, producing a voltage on the output lower than the voltage on the input, and a current on the output higher than the current of the regulated DC current signal.

2. An optical repeater according to claim 1, wherein said switched capacitor circuit is a ceramic hybrid integrated circuit.

3. An optical repeater system comprising:
  a plurality of optical repeaters;
  a regulated current supply system for supplying a regulated DC current signal to said optical repeaters;
  means for supplying a first optical signal;
  transmission means, formed by optical fibers and a conductor, for coupling said regulated current supply system and said plurality of optical repeaters, so that the regulated DC current signal is supplied to said optical repeaters via said conductor, and the first optical signal is supplied to said optical repeaters via said optical fibers,
  each of said optical repeaters including:
    an electrical circuit including:
      means for converting the first optical signal received from said optical fibers to an electrical signal;
      means for amplifying the electrical signal;
      means for converting the amplified signal to a second optical signal; and
      means for transmitting the second optical signal to the output of said optical repeater, and
    power supply means directly connected to said conductor for supplying power to said electrical circuit, including:
      means for receiving the regulated DC current signal directly from said conductor; and
      means for dropping the voltage and raising the current of the regulated DC current signal, and for supplying a DC current signal, having a current higher than the current of the regulated DC current signal, to said electrical circuit, comprising a switched capacitor circuit having an input connected to said conductor and an output connected to said electrical circuit, producing a voltage on the output lower than the voltage on the input, and a current on the output higher than the current of the regulated DC signal.

4. An optical repeater system, comprising:
  signal generating means for generating first and second signals, the first signal being a DC current signal having a first current value, and the second signal being an optical signal, comprising;
    optical signal generating means for generating the optical signal and DC current signal generating means for generating the DC current signal;
  a transmission path; and
  optical repeater means for repeating said optical signal coupled to said signal generating means via said transmission path, comprising a plurality of optical repeaters, each including:
    a first input for receiving the optical signal generated by said optical signal generating means;
    first means coupled to the first input for converting the received optical signal into an electrical signal;
    second means coupled to the first means for amplifying the electrical signal;
    third means coupled to the second means for converting the amplified electrical signal to an output optical signal;
    fourth means coupled to the third means for outputting the output optical signal to said transmission path;
    a second input coupled to said transmission path for directly receiving the DC current signal generated by said DC current signal generating means;
    fifth means coupled to the second input for dropping the voltage of the DC current signal, thereby raising the current of the DC current signal, comprising a switched capacitor circuit having an input connected to said DC current generating means via said transmission path and an output connected to the first means, producing a voltage at the output of said switched capacitor circuit that is less than the voltage at the input of said switched capacitor circuit; and
    an output coupled between the fifth means and the first means so that current supplied to said first means from said fifth means is greater than the current supplied to said fifth means from said DC current signal generating means via said second input, said optical repeater means including means for converting the DC current signal to a second current value higher than the first current value.

5. An optical repeater system according to claim 4, wherein said signal generating means comprises:
  optical signal generating means for generating the optical signal; and
  power signal generating means for generating the power signal.

6. An optical repeater system according to claim 4, wherein said switched capacitor circuit is a ceramic hybrid integrated circuit.

* * * * *